United States Patent [19]

Dilmore et al.

[11] 4,397,735
[45] Aug. 9, 1983

[54] BIPOLAR ELECTROLYZER PROCESS

[75] Inventors: Colonel R. Dilmore, Portland; Carl W. Raetzsch, Jr.; James J. McGinley, both of Corpus Christi, all of Tex.

[73] Assignee: PPG Industries, Inc., Pittsburgh, Pa.

[21] Appl. No.: 299,237

[22] Filed: Sep. 3, 1981

[51] Int. Cl.³ .......................... C25B 1/46; C25B 1/02
[52] U.S. Cl. .................................. 204/98; 204/128; 204/129
[58] Field of Search ..................... 204/98, 128, 129

[56] References Cited

U.S. PATENT DOCUMENTS 4,204,920  5/1980  Kurtz ................................ 204/98

*Primary Examiner*—R. L. Andrews
*Attorney, Agent, or Firm*—Richard M. Goldman

[57] ABSTRACT

Discloses a method of operating a bipolar electrolyzer having a plurality of electrolytic cells hydraulically in parallel where the flow rate of electrolyte and effluent provides circulation, mixing, and avoids pressure transients.

9 Claims, 4 Drawing Figures

BIPOLAR ELECTROLYZER PROCESS

DESCRIPTION OF THE INVENTION

Chlorine and aqueous alkali metal hydroxides, e.g., sodium hydroxide and potassium hydroxide, may be prepared by the electrolysis of aqueous alkali metal chlorides, e.g., sodium chloride and potassium chloride, in an electrolytic cell having an anolyte compartment separated from a catholyte compartment by a permionic membrane therebetween.

One particular type of electrolytic cell structure particularly suited for the large scale electrolysis of aqueous alkali metal chlorides is a bipolar electrolyzer. A bipolar electrolyzer contains a plurality of individual electrolytic cells electrically and mechanically in series. The series structure is provided by a sequential replication of common structural units, i.e., bipolar units, also known as bipolar elements. The sequence of these common structural units, i.e., the number of cells in the electrolyzer, is generally three or more, for example, ten or even twenty or more, depending upon the availability of electrical power and transformer capacity.

Bipolar electrolyzers when further combined with planar electrodes substantially in contact with the permionic membrane offer a compact structure and economies of construction, operation, and maintenance.

As herein contemplated a bipolar electrolyzer is provided having an electrolyte recirculation system. The electrolyte recirculation system is characterized by removal of product gases, e.g., chlorine or hydrogen, with electrolyte as a froth of electrolyte and gas under flow conditions that avoid pressure fluctuations and transients across the individual permionic membranes, maintain the electrolyte chemistries substantially invariant with time and between cells, and have combined therewith means for avoiding stray current leakage between cells.

THE FIGURES

The invention, including various exemplifications and embodiments thereof, may be understood by references to the Figures.

DETAILED DESCRIPTION OF THE INVENTION

Figure 1:
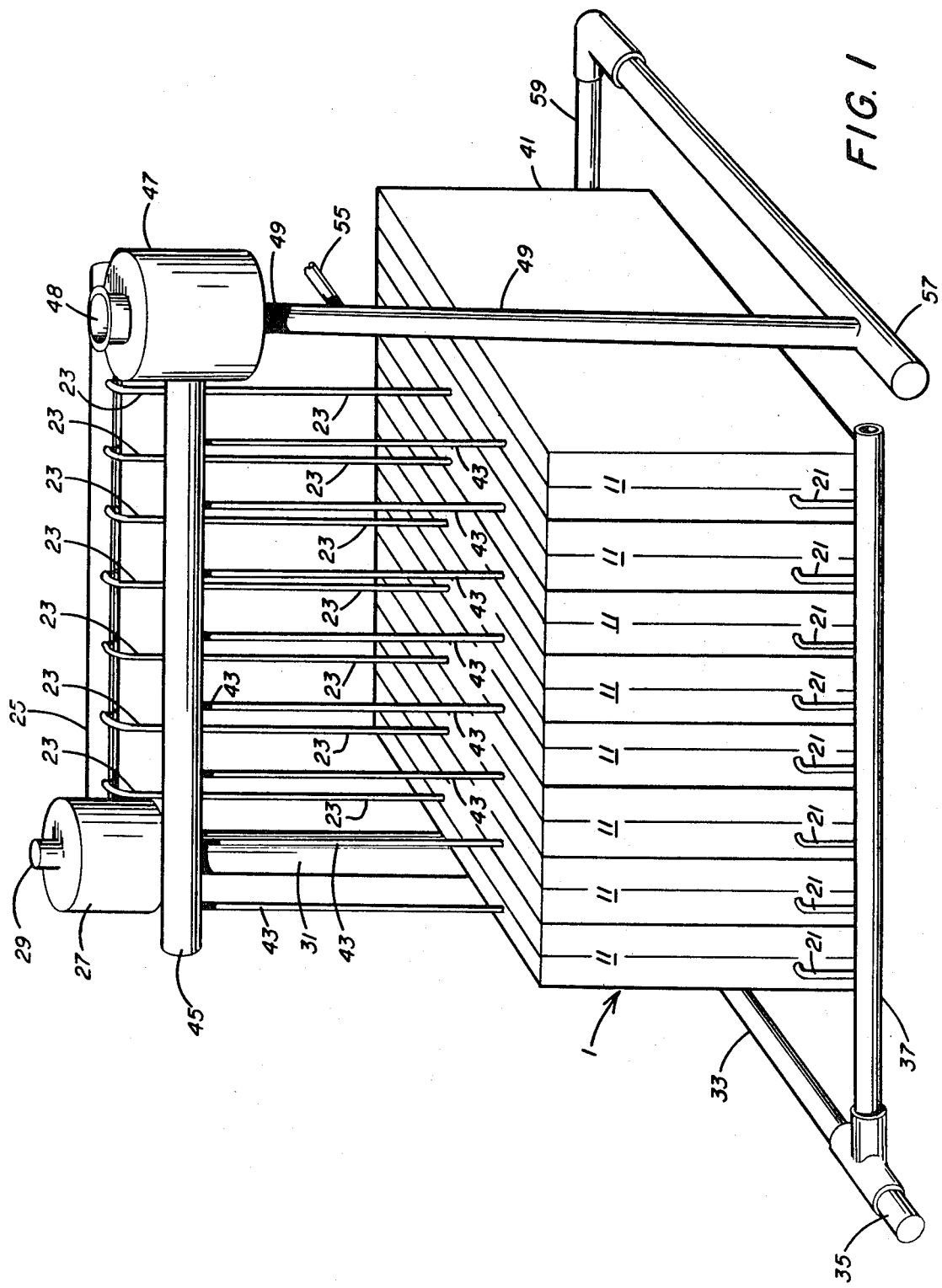
FIG. 1 is an isometric view of a bipolar electrolyzer.
Figure 2:
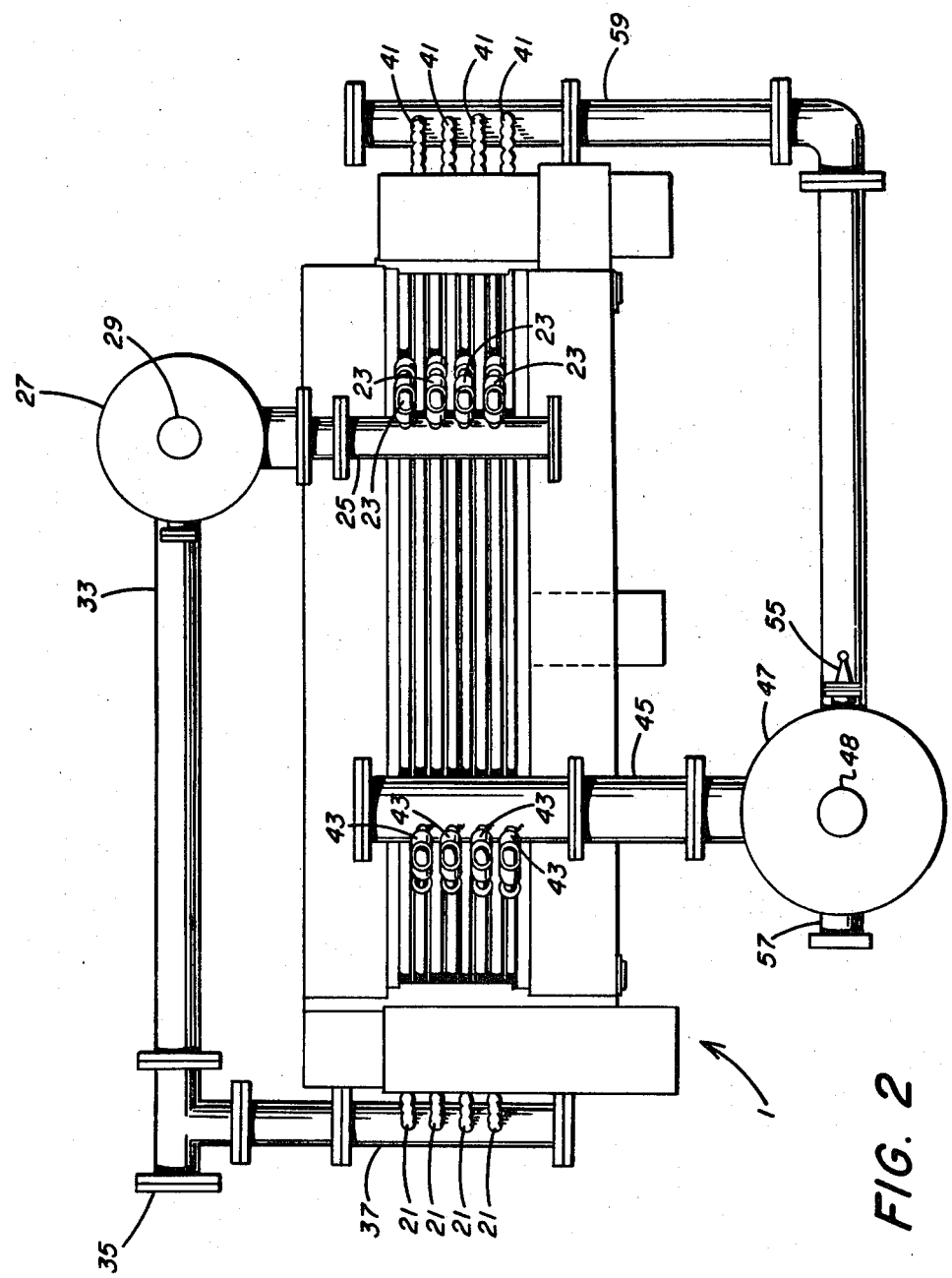
FIG. 2 is a plan view of the bipolar electrolyzer illustrated in FIG. 1.
Figure 3:
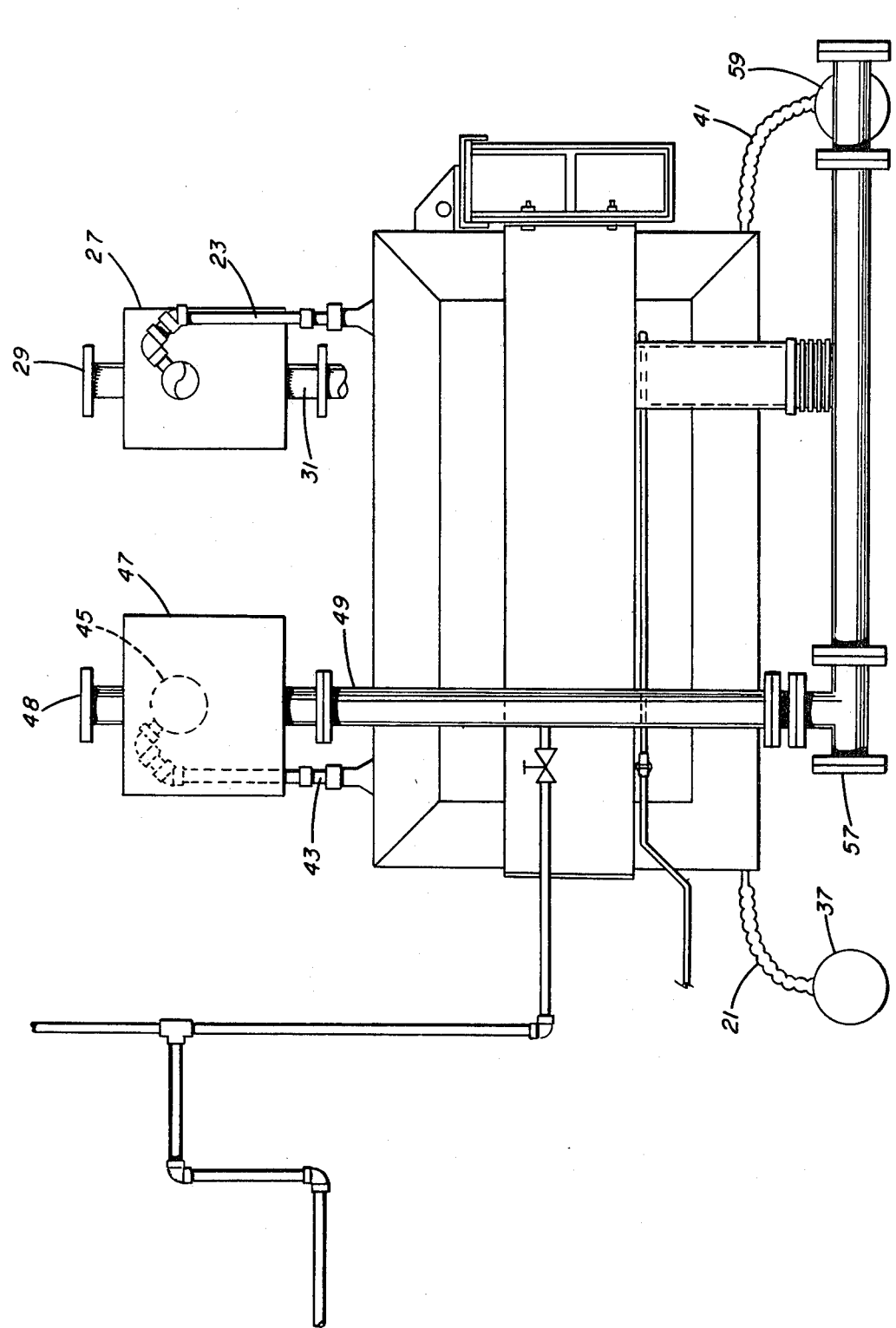
FIG. 3 is a front elevation of the bipolar electrolyzer illustrated in FIGS. 1 and 2.

A bipolar electrolyzer contains a plurality of individual electrolytic cells electrically and mechanically in series. Each individual electrolytic cell is made up of an anodic unit or member and a cathodic unit or member. The anodic unit or member of one individual electrolytic cell in the electrolyzer and the cathodic unit of the prior electrolytic cell in the electrolyzer form a bipolar element. The cathodic unit of a bipolar cell and the anodic unit of the next adjacent, subsequent bipolar cell also form a bipolar element, equivalently known as bipolar unit, or a bipolar electrode. In this way the cathodic element of a subsequent bipolar electrode and the anodic element of a prior bipolar electrode, adjacent to each other, form an individual electrolytic cell.

The bipolar element may be separate unitary members, i.e., containment vessels, sharing by a common conductor-connector element. Alternatively an individual bipolar element may have a common monolithic wall between the anodic and cathodic members thereof, for example with suitably resistant surfaces thereon, i.e., an anolyte resistant surface on the side in the anodic half cell, i.e., the anolyte compartment, of one cell and a catholyte resistant surface on the side in contact with the cathodic half cell, i.e., the catholyte compartment, of the adjacent cell.

The bipolar electrolyzer herein contemplated is further characterized by having planar anodes and planar cathodes. The planar electrodes are spaced from and parallel to the electrolyte compartment base, parallel to each other, and the anodes and cathode of an individual electrolytic cell are spaced from each other by the permionic membrane.

The electrodes are, in a preferred exemplification, in contact with the permionic membrane. As herein contemplated, with the electrodes contacting the permionic membrane, the electrodes may be in the form of non-catalytic current carriers in contact with electrocatalyst particles that are bonded to and embedded in a surface of the permionic membrane, for example a ruthenium dioxide-titanium dioxide coated titanium mesh or screen in contact with platinum black or platinized platinum particles embedded in and bonded to the anodic surface of the permionic membrane, or stainles steel mesh or screen in contact with platinized platinum or platinum black particles embedded in and bonded to the cathodic surface of the permionic membrane.

In an alternative exemplification the electrodes may comprise a porous, i.e., electrolyte and gas permeable, substrate, such as sheet, plate, screen, mesh, gauze, foil, or the like having electrocatalyst bonded and adherent thereto, the substrate bearing either on the permionic membrane or bearing on particles of a surface catalyst e.g., a surface modifier, as a bubble release agent, or of an electrical conductor adherent to the permionic membrance, the particles of the surface catalyst or electrical conductor being bonded to or embedded in the permionic membrane, or bearing on a porous film, layer, coating, laminate, or the like of a surface catalyst, hydrophilic material, or hydrophobic material.

According to a still further exemplification of this invention the one or both electrodes may be in the form of porous sheet, plate, film, mesh, gauze, film, screen or the like, having a surface material of electrocatalyst adherent thereto. In this alternative exemplification the porous plate, sheet, screen, gauze, film, mesh or the like is in contact with suitable porous material, for example a porous, hydrophilic material or a porous hydrophobic material that is preferably adherent to the permionic membrane, as a film, coating, layer, or deposit.

As herein contemplated the porous electrode substrate is removably in contact with the permionic membrane. That is, it may be removed from contact with the permionic membrane during cell diassembly without damage to the electrode or the permionic membrane arising therefrom.

According to an alternative exemplification of the bipolar electrolyzer herein contemplated the electrode substrate may be spaced from the permionic membrane. While this is not normally necessary, i.e., because of the electrically insulating properties of the permionic membrane, to prevent direct shorting from anode to cathode, it may be necessary for other reasons to space one or both electrodes from the permionic membrane.

FIGS. 1, 2, 3 and 4 show a bipolar electrolyzer 1 having a plurality of individual electrolytic cells 11. The electrolytic cells 11 are electrically and mechanically in series and hydraulically in parallel. Brine, for example sodium chloride brine or potassium chloride brine or mixed sodium chloride brine and potassium chloride brine is fed to the anolyte compartments of the individual electrolytic cells 11 and water or dilute aqueous alkali metal hydroxide, e.g., sodium hydroxide or potassium hydroxide or a solution of sodium hydroxide and potassium hydroxide, is fed to the catholyte compartments of the individual electrolytic cells 11. Electrical current is imposed upon the electrolyzer 1 whereby to evolve chlorine at the anodes 121, hydroxyl ion in the catholyte liquor and hydrogen at the cathodes 101 with hydrogen gas and catholyte liquor rising through cathode risers 43. On the brine side of the circuit a froth of anolyte liquor and chlorine gas bubbles travel out of the individual anolyte compartments of the individual electrolytic cells 11 through individual risers 23.

The anolyte riser 23 and catholyte risers 43 are sized to provide for bubble flow wherein the bubbles of the gas, for example chlorine or hydrogen move along at about the same velocity as the liquid, e.g., sodium chloride in the anodic risers 23 and sodium hydroxide in the cathodic risers 43 or potassium chloride in the anodic riser 23 and potassium hydroxide in the cathodic riser 43, while avoiding both periodic waves of frothy slugs which move at a greater velocity than the average liquid velocity and alternating slugs of liquid and gas. In this way there is avoided pressure transients and oscillations, thereby keeping oscillatory, random, or transient component of the pressure drop across the permionic membrane under about one pound per square inch and preferably under about 0.10 pound per square inch.

The individual anolyte and chlorine risers 23 have a horizontal surface area normal to the direction of flow sufficient to provide a mass flow rate of electrolyte and gas therethrough of from about 50,000 to about 500,000 pounds per hour per square foot of riser area and preferably from about 100,000 to about 400,000 pounds per hour per square foot of riser area. A head of from about 10 to about 30 inches of anolyte liquor and preferably from about 12 to about 20 inches of anolyte liquor is maintained within the anolyte compartment and the gas—electrolyte froth within the anolyte compartment has a void fraction of about 10% to about 45% and preferably from about 15% to about 35%. The froth of anolyte liquor and chlorine is recovered through the risers 23 as a froth having a void fraction of about 65 to 95 percent, and is collected in a common header 25, which common header 25 is preferably substantially horizontal. Thereafter the froth is conducted via header 25 to a chlorine separator 29, for example a separation tank, a vortex separator, or a cyclone separator wherein the froth is separated into chlorine gas, which is recovered through outlet 29, and return anolyte liquor which is returned through downcomer 31. The return of anolyte liquor, for example from downcomer 31 and pipes 33 is mixed with concentrated brine, for example from feedline 35 and returned to the anolyte compartment through a header and individual feed lines 21 to the anolyte compartments of the individual electrolytic cells 11.

The amount of concentrated brine added to the return anolyte is from about one part of concentrated brine per part of return anolyte liquor to about one part of concentrated brine per twenty parts of return anolyte liquor and preferably from about one part of concentrated brine per three parts of return anolyte liquor to about ten parts of return anolyte liquor per part of concentrated brine.

On the cathodic side, a froth of catholyte liquor and hydrogen gas bubbles travel up through the individual riser 43 from the catholyte compartments of the individual electrolytic cells 11 to a common header 45. The froth of catholyte liquor and hydrogen gas is collected in the common header 45 which is substantially horizontal and transported via the common header 45 to the hydrogen separator 47, for example a separation tank, a vortex separator or cyclone separator. In the separator 47 the froth is separated into hydrogen gas which is recovered at outlet 48 and return catholyte liquor which passes through downcomer 49. The return catholyte liquor in downcomer 49 has a bleed stream removed therefrom, i.e. a bleed stream of alkali metal hydroxide product, which may be recovered at collector 55. Make up electrolyte, e.g., water or dilute aqueous alkali metal hydroxide is added, for example at feed stream 57 and the resulting catholyte liquor and feed travels through header 59 to individual feed lines 41.

The amount of dilute caustic or water added to the return catholyte liquor is from about one part of water or dilute caustic per thirty parts of return catholyte liquor to about one part of dilute caustic or water per two hundred parts of return catholyte liquor and preferably from about one part of water or dilute caustic per forty parts of return catholyte liquor to about one part of water or dilute caustic per about eighty parts of return catholyte liquor.

Both recovery streams, i.e., the chlorine-anolyte liquor stream and the hydrogen-catholyte stream are operated so as to maintain pressure oscillations or transients across the permionic membrane below one pound per square inch and preferably below about 0.10 pound per square inch. The pressure across the permionic membrane, i.e., the head across the permionic membrane has two components, an average head which depends upon the physical and chemical parameters of the permionic membrane, caustic strength, and the anolyte composition, but is generally from about 0.10 to about 1.0 pound per square inch and a random, or transient component. When no attention is paid to the sizing of the piping, the range of the random, or transient component may be from minus one pound per square inch to plus one pound per square foot. The flow characteristics herein contemplated reduce the oscillatory or transient component to an average value of 0 and a range of extremes of up below 0.25 pounds per square inch and preferably less than one pound per square inch and particularly preferred less than 0.10 pounds per square inch.

It has been found that the random, transient, or oscillatory component can be reduced to a range of under one pound per square inch and preferably under 0.10 pound per square inch by sizing the risers 23 and 43 and the headers 25 and 45 so as to avoid waves that are picked up periodically in the form of a frothy slug and moved at a much greater velocity than the average liquid velocity, and also alternate plugs of liquid and gas moving along the pipe. Preferably, the flow in the risers 23 and 43 is characterized by bubbles of gas moving along at about the same velocity as the liquid therein. As herein contemplated, the desired bubble flow may be enhanced while slug flow and plug flow are substantially avoided by having the anolyte riser 23 and catholyte riser 43 sized so as to provide for a mass flow rate therethrough from about 50,000 to about 500,000 pounds per hour per square foot of riser area and preferably from about 100,000 to about 400,000 pounds per hour per square foot of riser area, a head of about 10 to 30 inches of water in the anolyte and preferably from about 12 to 20 inches of water therein, a head of from about to 0 to about 40 inches of water on the catholyte side and preferably from about 10 to 30 inches, and a gas fraction of from about 10 to 45 percent on the anode side and preferably from about 15 to 35 percent therein and from about 3 to about 20 percent and preferably from about 3 to about 10 percent on the catholyte side. Moreover, as will be described more fully hereinbelow, with respect to control of stray electrical currents between adjacent electrolytic cells, the height of the risers is such as to avoid current flows between adjacent electrolytic cells.

Figure 4:
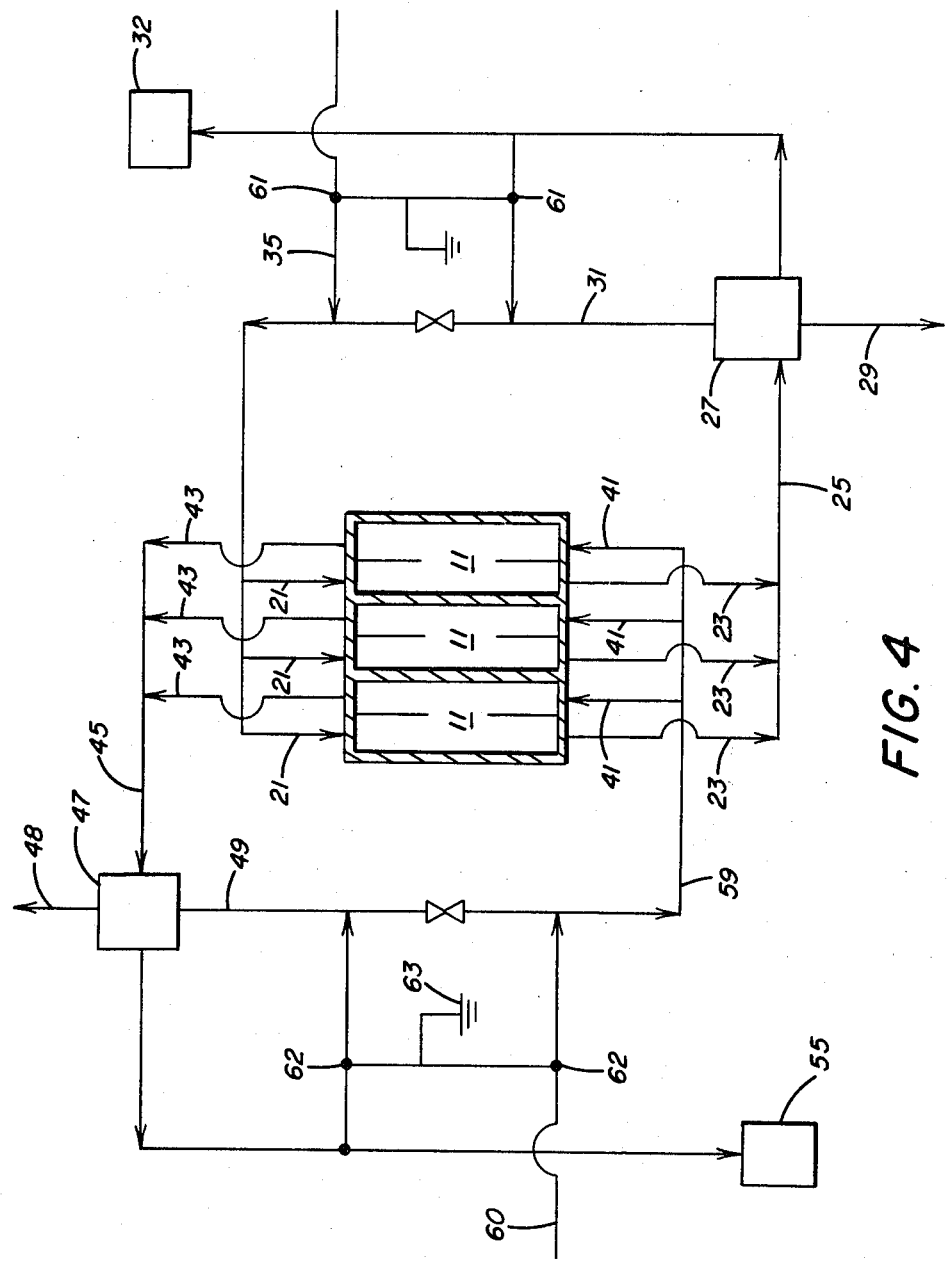
FIG. 4 is a schematic plan view of the electrolyzer electrolyte circulation system, including the electrolytic protection system therefor.

FIG. 4 shows the electrolyte and gas systems in a particularly preferred electrical grounding system. The electrolyzer 1 with individual electrolytic cells 11 has a chlorine and brine side, as described above, with brine inlets 21 conveying brine to the individual cells 11, chlorine and anolyte risers 23 conveying a froth of chlorine and anolyte to header 25, and from the header to a separator 27 where chlorine gas is recovered from the separator at outlet 29 and an overflow 30 to a depleted brine tank 32, as well as a brine and anolyte liquor return line 31 and a concentrated brine line 35. Electrodes 61 are provided in contact with the brine. The anodes may be at various locations, for example at brine feed 35, or at the return downcomer 31. The electrodes are grounded 63. The electrodes are fabricated of a material that is resistant to acidic solutions, for example, the electrodes are fabricated of those materials that form a protective oxide film under acidic condition, i.e., the valve metals.

On the hydrogen-caustic side, there is a dilute cell liquor inlet 41 to the individual cells 11. A froth of hydrogen and alkali metal hydroxide is recovered through risers 43 which lead the froth to a common horizontal header 45. The common horizontal header 45 conveys the froth to a separator 47 where the froth is separated into hydrogen which is recovered at the gas recovery means 48, and to a catholyte liquor downcomer 49 for overflow of cell liquor and product recovery 55. Make up, i.e., water, or dilute caustic or caustic potash is added to the return catholyte liquor, i.e., the return cell liquor. Addition may be made at various locations, e.g., in or below the separator 47, or at feed point 60. The make up and return cell liquor return to the individual cells through return line 59 and individual feed inlets 41. Electrodes 62 are provided in contact with the return, e.g., at the overflow outlet 55 or make up feed 60 or even downcomer 49 or header 59. The individual electrodes 62 are grounded 63. Typically the electrodes 62 are a material that is electrically conductive, and resistant to the alkaline cell liquor, e.g. iron, steel, stainless steel, nickel and the like.

The electrolyte spacing between adjacent cells, that is the liquid path from the anolyte compartment of an electrolytic cell 11 through riser 23 to header 25 hence to the adjacent riser 23 and through the adjacent riser 23 to the anolyte compartment of the adjacent cell 11, i.e., from the anolyte of one adjacent cell to the anolyte of the next adjacent cell, and from the catholyte of an electrolytic cell 11 through hydrogen riser 43 to header 45 and from header 45 to riser 43 of the next adjacent cell, i.e., from catholyte of an electrolytic cell 11 to the catholyte of the next adjacent electrolytic cell 11 is such as to avoid stray currents.

The space from the permionic membrane to the partition in the back of the electrolyte compartment, i.e., to the back 79 of the anolyte compartment or to the back of the catholyte compartment is such as to enhance gas lift, and high void volume in the electrolyte. Preferably, the spacing is narrow enough to allow the liquid entering through the electrolyte feed, 21, 41, at the bottom of the compartments to have the velocity thereof enhanced by the gas lift of the evolved gases, forming a froth which froth is carried to the risers 23, 43 at the top opposite side by the gas lift, providing a gas void volume of 10 to 45 percent and preferably from about 15 to 35 percent; a gas void volume of 75 to 95 percent in the risers, a gas lift velocity sufficient to provide rapid recirculation through the system described above, and a gas lift velocity sufficient to provide good mixing.

Generally the space from the permionic membrane to the back of the electrolyte compartment is such as to provide a current flow per unit electrolyte volume in excess of 1200 amperes per cubic foot of electrolyte volume and preferably above about 1500 amperes per cubic foot of electrolyte volume. As used herein the electrolyte volume is only anolyte compartment volume or is only catholyte compartment volume taken individually. In a particularly preferred exemplification the current per unit electrolyte volume is above about 2500 amperes per cubic foot of electrolyte volume per compartment, and the current density is from 150 to 600 amperes per square foot.

The permionic membrane interposed between the anode and the cathode is formed of a polymeric fluorocarbon copolymer having immobile, cation selective ion exchange groups on a halocarbon backbone. The membrane may be from about 2 to about 25 mils thick, although thicker or thinner permionic membranes may be utilized. The permionic membrane may be a laminate of two or more membrane sheets. It may, additionally, have internal reinforcing fibers.

The functional group of the permionic membrane is a cation selective group. It may be a sulfonic group, a phosphoric group, a phosphonic group, a carboxylic group, a precursor thereof, or a reaction product thereof, e.g., an ester thereof. Carboxylic groups, precursors thereof, and reactions products thereof are preferred. Thus, as herein contemplated, A is chosen from the group consisting of

—COOH,

—COOR$_1$,

—COOM,

—COF,

—COCl,

—CN,

—CONR$_2$R$_3$

—SO$_3$H,

—SO$_3$M,

—SO$_2$F, and

—SO$_2$Cl where R$_1$ is a C$_1$ to C$_{10}$ alkyl group, R$_2$ and R$_3$ are hydrogen or C$_1$ to C$_{10}$ alkyl groups, and M is an alkali metal or a quaternary ammonium group. According to a preferred exemplification, A is —COCl,

—COOH,

—COOR$_1$,

—SO$_2$F, or

—SO$_2$Cl where R$_1$ is a C$_1$ to C$_5$ alkyl.

According to a particularly preferred exemplification, A is chosen from the group consisting of —COCl,

—COOH, and

—COOR$_1$, where R$_1$ is a C$_1$ to C$_5$ alkyl, i.e., where A is a carboxylic acid group, a reaction product thereof, or a precursor thereof, whereby to provide a higher alkali metal hydroxide content in the catholyte product, at a current efficiency than that normally associated with sulfonyl, phosphonic, or phosphoric groups.

As herein contemplated, the permionic membrane is preferably a copolymer which may have:

(I) fluorovinyl ether acid moieties derived from

CF$_2$=CF—O—[CF$_{2b}$(CX'X'')$_c$(CFX')(CF$_2$—O—CX'X'')$_e$(CX'X''—O—CF$_2$)$_f$]—A, exemplified by

CF$_2$=CFOCF$_2$CF(CF$_3$OCF$_3$CF$_2$CF$_2$COOOCH$_3$,

CF$_2$=CFO(CF$_2$)$_3$OCFCOOCH$_3$,
|
CF$_3$

CF$_2$=CFO(CF$_2$)$_4$OCFCOOCH$_3$,
|
CF$_3$

CF$_2$=CFOCF$_2$CFCF$_2$COOCH$_3$, and
|
CF$_3$

CF$_2$=CFOCF$_2$CF(CF$_3$)OCF(COOCH$_3$)CF$_3$, inter alia:

(II) fluorovinyl moieties derived from

CF$_2$=CF—(O)$_a$—(CFX')$_d$—A, exemplified by

CF$_2$—CF(CF$_2$)$_{2-4}$COOH$_3$,

CF$_2$—CF(CF$_2$)$_{2-4}$COOHCH$_3$,

CF$_2$=CFO(CF)$_{2-4}$COOH$_3$,

CF$_2$CFL(CF$_2$)$_{2-4}$COOC$_2$H$_5$, and

CF$_2$=CFO(CF$_2$)$_{2-4}$COOCH$_3$, inter alia;

(III) fluorinated olefin moieties derived from

CF$_2$=CXX' as exemplified by tetrafluoroethylene, trichlorofluoroethylene, hexafluoropropylene, trifluoroethylene, vinylidene, fluoride, and the like; and (IV) vinyl ethers derived from

CF$_2$=CFOR$_4$

The permionic membrane herein contemplated has an ion exchange capacity of from about 0.5 to about 2.0 milliequivalents per gram of dry polymer, preferably from about 0.9 to about 1.8 milliequivalents per gram of dry polymer, and in a particularly preferred exemplification, from about 1.0 to about 1.6 milliequivalents per gram of dry polymer. The permionic membrane herein contemplated has a volumetric flow rate of 100 cubic millimeters per second at a temperature of 150 to 300 degrees Centigrade, and preferably at a temperature between 160 to 250 degrees Centigrade. The glass transition temperature of the permionic membrane polymer is below 70° C., and preferably below about 50° C.

The permionic membrane herein contemplated may be prepared by the methods described in U.S. Pat. No. 4,126,588, the disclosure of which is incorporated herein by reference.

Most commonly the ion exchange resins will be in a thermoplastic form, i.e., a carboxylic acid ester, e.g., a carboxylic acid ester of methyl, ethyl, propyl, isopropyl, or butyl alcohol, or a sulfonyl halide, e.g., sulfonyl chloride or sulfonyl fluoride, during the fabrication herein contemplated, and will thereafter be hydrolyzed.

According to an alternative exemplification the permionic membrane has a porous, gas and liquid permeable, non-electrode layer bonded to either the anodic surface, or the cathodic surface, or both the anodic and cathodic surfaces thereof, as described in British Laid Open patent application No. 2,064,586 of Oda et al. As described by Oda et al the porous, non-catalytic, gas and electrolyte permeable, non-electrode layer does not have a catalytic action for the electrode reaction, and does not act as an electrode.

The porous, non-electrode layer is formed of a non hydrophobic material, either organic or inorganic. As disclosed by Oda et al the non-hydrophobic, non electrode material may be electrically non conductive. That is, it may have an electrical resistivity above 0.1 ohm-centimeter, or even above 1 ohm-centimeter. Alternatively, the porous, non-electrode layer may be formed of an electrically conductive material having a higher overvoltage than the electrode material placed outside the porous, non-electrode layer, that is, the porous, non-electrode layer may be formed of an electrically conductive material that is less electrocatalytic then the electrode material placed outside the porous, non-electrode layer.

The material in the porous, non-electrode layer is preferably a metal, metal oxide, metal hydroxide, metal nitride, metal carbide, or metal boride of a Group IVA metal, e.g., Si, Ge, Sn, or Pb, a Group IVB metal, e.g., Ti, Zr, or HF, a Group V-B metal, e.g., V, Nb, or Tn, a Group VIB metal, e.g., Cr, Mo, or W, or a Group VIII "iron Trial" metal, e.g., Fe, Co, or Ni. Especially preferred non-electrode materials are Fe, Ti, Ni, Zr, Ta, V, and Sn, and the oxides, hydroxides, borides, carbides, and nitrides thereof, as well as mixtures thereof.

Alternatively, the film, coating or layer, especially on the anodic side, may be formed of a perfluorocarbon polymer rendered suitably hydrophilic, i.e., by the addition of a mineral, as potassium titanate.

The non-electrode material is present in the porous film, coating, or layer as a particulate. The particles have a size range of from about 0.01 micron to about 300 microns, and preferably of from about 0.1 to 100 microns. The loading of particles is from about 0.01 to about 30 milligrams per square centimeter, and preferably from about 0.1 to about 15 milligrams per square centimeter.

The porous film, coating or layer has a porosity of from about 10 percent to 99 percent, preferably from about 25 to 95 percent, and in a particularly preferred exemplification from about 40 to 90 percent.

The porous film, coating or layer is from about 0.01 to about 200 microns thick, preferably from about 0.1 to about 100 microns thick, and in a particularly preferred embodiment, from about 1 to 50 microns thick.

When the particles are not directly bonded to and embedded in the permionic membrane a binder is used to provide adhesion. Typically the binder is of fluorocarbon polymer, preferably a perfluorocarbon polymer, as polytetraflonethylene, polyhexafluoropropylene, or a perfluoroalkoxy, or a copolymer thereof with an alejinically unsaturated perfluorinated acid, e.g., having sulfonic or carboxylic functionality.

The electrodes 101, 121, may either bear upon the porous, non-electrode surface or be spaced therefrom.

As contemplated herein, the current density of the electrolytic cell is higher than that in a conventional permionic membrane cell or diaphragm cell, for example, in excess of 200 amperes per square foot, and preferably in excess of 400 amperes per square foot. According to one preferred exemplification of this invention, electrolysis may be carried out at a current density of 400 or even 600 amperes per square foot, where the current density is defined as total current passing through the cell divided by the surface area of one side of the permionic membrane 33.

In order to attain the high current densities herein contemplated, a uniform current distribution across the face of the permionic membrane 99 is desirable. This may be accomplished by utilizing electrode substrates for the anode and the cathode having a high percentage of open area, e.g., above about 40 to 60 percent open area, and a narrow pitch, e.g., about 1.0 to 10 millimeters between substrate elements, meshes, or strands. A suitable substrate is mesh or screen having 2 to 25 or more strands per inch, where the strands are from about 1.0 to about 10 millimeters apart, centerline to centerline, and a diameter such as to provide at least about 40, and preferably above about 60 percent open area and from about 75 to about 400 openings per square centimeter. The mesh or screen is fabricated of a material that is resistant to the electrolyte, and electrically conductive. The resulting electrode has an electrocatalytic surface thereon. Alternatively, the electrode support may be a coated sheet or plate, having perforations on a pitch of 0.5 to 1.5 millimeters, and at least about 40 to 60 percent open area.

The cathode substrate is a metal that is resistant to aqueous alkali metal hydroxides present at the concentrations herein contemplated, i.e., from about 2 moles per liter of aqueous alkali metal hydroxide to about 15 moles per liter of aqueous alkali metal hydroxide, and generally from about 10 moles per liter of aqueous metal hydroxide to about 14 moles per liter of aqueous metal hydroxide. Suitable materials include mild steel, stainless steel, cobalt, nickel, silver, copper, and alloys of titanium with yttrium as described more fully in U.S. Pat. No. 4,075,020 to D. W. DuBois et al for electrode material and U.S. Pat. No. 4,133,730 to D. W. Duois et al for *Electrolysis of brine using Titanium Alloy Electrode.* Generally the materials of construction utilized in fabricating the cathode substrate are those materials also useful in fabricating the lining of those portions of the bipolar unit in contact with catholyte liquor.

The cathode electrocatalysts are adherent to the cathode substrate as a coating, layer, film, or deposit thereon. The cathode catalyst may be the same material as the cathode substrate, for example, rendered porous or electrically active by removal of a constituent thereof. Alternatively, and most frequently, the cathode electrocatalyst is a different material than the cathode substrate. Typical cathode electrocatalysts useful herein include various porous forms of nickel, i.e., as codeposited with a leachable such as aluminum or zinc wherein the aluminum or zinc is removed therefrom. Alternatively, the cathode electrocatalyst may be a compound of a platinum group metal, i.e., a compound of ruthenium or rhodium, or palladium, or osmium, or irridium, or platinum, or a combination thereof. Alternatively, the cathode electrocatalyst may be a high surface form of a platinum group metal as platinum black, platinized platinum, palladium black, or palladiumized palladium. According to a still further exemplification of this invention, the cathode electrocatalyst may be a high surface area compound of a transition metal as a compound comprising iron, or cobalt, or nickel, or manganese, or chromium, or molybdenum, or tungsten, vanadium, niobium, tantalum, titanium, or zirconium, or an oxide thereof, for example, manganese oxide, or iron oxide, or cobalt oxide, or nickel oxide, or a mild compound thereof as a mixed oxide of cobalt and nickel or an oxycompound comprising cobalt, nickel, and oxygen or cobalt, nickel, iron, and oxygen, or nickel, cobalt, and oxygen, or the like. According to a still further exemplification, the cathode electrocatalyst may contain rhenium, lead, tin, cadmium, mercury, silver, gold, or mixtures or compounds thereof.

The anode substrate is typically fabricated of a metal resistant to aqueous alkali metal chlorides in acidic media under reducing conditions. Such metals include the valve metals, i.e., those metals which form an oxide under the aforementioned conditions, such as titanium, zirconium, hafnium, vanadium, niobium, tantalum, and tungsten. Typically the anodic electrocatalyst is a material different from the anodic substrate and is present on the anodic substrate as a coating, film, layer, or deposit adherent thereto. Typical materials compounds of the platinum group metals, oxycompounds of the platinum group metals, oxycompounds of the platinum group metals with oxycompounds of film-forming metals, and oxycompounds of the platinum group metals, film-forming metals, and additional metallic constituents. Typical catalytic films, surfaces, coatings, and layers which may be applied to the anodic electrode substrate include platinum, platinumiridium, palladium oxide, palladium oxide in combination with an oxide of a valve metal, oxycompounds of ruthenium and titanium, and ruthenium and titanium with various other additives including gallium, indium, thalium, germanium, tin, lead, antimony, bismuth, copper, silver, gold, various of the transition metals, various of the rare earth metals, yttrium, and various alkaline earth metals.

The materials of construction used in fabricating the bipolar electrolyzer herein contemplated are those which are resistant to the electrolytes encountered during the conditions of electrolysis and resistant to corrosion during both electrolysis and its cell shut-down. These materials used for the cathode compartment include steel, stainless steel, nickel, and copper. Those used for the anode compartment include the valve metals, as described above, and most frequently titanium and alloys of titanium, such as alloys of titanium with molybdenum, alloys of titanium with palladium, alloys of titanium with nickel, and alloys of titanium with yttrium. Additionally, the entire bipolar electrolyzer may be prepared from an alloy of titanium and yttrium as described in U.S. Pat. No. 4,075,070 to DuBois et al for *Electrode Material* and U.S. Pat. No. 4,133,730 to DuBois et al for *Electrolysis of Brine Using Titanium Alloy Electrode.*

While the invention has been described with reference to certain particular exemplifications and embodiments thereof, the inventive concept sought to be protected is not to be limited thereby, but only by the claims appended hereto.

We claim:

1. In a method of operating a bipolar electrolyzer comprising feeding a brine electrolyte to anolyte compartments of the individual electrolytic cells and an aqueous electrolyte to catholyte compartments of the individual electrolytic cells, imposing an electrical potential across the electrolyzer, recovering chlorine and anolyte liquor from the anolyte compartment, and hydrogen and aqueous alkali metal hydroxide from the catholyte compartment, the improvement comprising:

(1) recovering chlorine and anolyte liquor from individual cells of the electrolyzer through individual vertical risers at an anolyte liquor flow rate sufficient to provide flow characterized by bubbles of gas moving along at substantially the same velocity as the anolyte liquor, while substantially avoiding flow characterized by periodic waves of high velocity frothy slugs and alternating plugs of liquid and gas;

(2) collecting the chlorine and anolyte liquor from the individual risers in a substantially horizontal header;

(3) transporting the collected chlorine and anolyte liquor from all of the cells in the electrolyzer through the substantially horizontal header to a chlorine disengaging chamber;

(4) separating the chlorine from the anolyte liquor in the disengaging chamber;

(5) recovering chlorine from the disengaging chamber;

(6) recovering anolyte liquor from the disengaging chamber;

(7) adding concentrated brine to the anolyte liquor whereby to form feed brine;

(8) returning the feed brine to the electrolyzer;

(9) separating hydrogen from the aqueous alkali metal hydroxide whereby to recover the hydrogen; and

(10) separating the aqueous alkali metal hydroxide into product alkali metal hydroxide and return catholyte liquor, recovering the product alkali metal hydroxide, adding water to the return cell liquor, and returning the water and return cell liquor to the electrolyzer.

2. The method of claim 1 comprising adding concentrated brine to the anolyte liquor in the ratio of 1 part of concentrated brine per part of return anolyte liquor to about 1 part of concentrated brine per 20 parts of return anolyte liquor, whereby to enrich the return anolyte liquor in alkali metal chloride content.

3. The method of claim 1 comprising maintaining a head of about 10 to about 30 inches of water on the anolyte liquor.

4. The method of claim 1 wherein the anolyte liquor in the vertical risers has a void fraction of about 75 to about 95 percent.

5. The method of claim 1 comprising:

(a) recovering hydrogen and catholyte liquor from individual cells of the electrolyzer through individual vertical risers at a catholyte liquor flow rate sufficient to provide flow characterized by bubbles of gas moving along at substantially the same velocity as the catholyte liquor while substantially avoiding flows characterized by periodic waves of high velocity frothy slugs and alternating plugs of liquid and gas;

(b) collecting the hydrogen and catholyte liquor from the individual risers in a substantially horizontal header;

(c) transporting the collected hydrogen and catholyte liquor from all of the cells in the electrolyzer through the substantially horizontal header to a hydrogen disengaging chamber;

(d) recovering hydrogen from the disengaging chamber;

(e) recovering catholyte liquor from the disengaging chamber;

(f) adding water to the catholyte liquor in the ratio of 1 part of water per 40 parts of return catholyte liquor to part 1 part of water per 200 parts of return catholyte liquor; and (g) returning the return catholyte liquor to the individual electrolytic cells.

6. The method of claim 5 wherein the flow rate of catholyte liquor through the individual vertical riser is from about 50,000 to about 500,000 pounds per square foot per hour.

7. The method of claim 5 comprising maintaining a head of about 0 to about 40 inches of water on the catholyte liquor.

8. The method of claim 5 wherein the catholyte liquor in the vertical riser has a void fraction of about 75 to about 95 percent.

9. In a method of operating a bipolar electrolyzer comprising feeding a brine electrolyte to anolyte compartments of the individual electrolytic cells and an aqueous electrolyte to catholyte compartments of the individual electrolytic cells, imposing an electrical potential across the electrolyzer, recovering chlorine and anolyte liquor from the anolyte compartment and hydrogen and aqueous alkali metal hydroxide from the catholyte compartment, the improvement comprising:

(1) recovering chlorine and anolyte liquor from individual cells of the electrolyzer through individual vertical risers at an anolyte liquor flow rate sufficient to provide flow characterized by bubbles of gas moving along at substantially the same velocity as the anolyte liquor, while substantially avoiding flow characterized by periodic waves of high velocity frothy slugs and alternating plugs of liquid and gas;

(2) collecting the chlorine and anolyte liquor from the individual risers in a substantially horizontal header;

(3) transporting the collected chlorine and anolyte liquor from all of the cells in the electrolyzer through the substantially horizontal header to a chlorine disengaging chamber;

(4) separating the chlorine from the anolyte liquor in the chlorine disengaging chamber;

(5) recovering chlorine from the chlorine disengaging chamber;

(6) recovering anolyte liquor from the chlorine disengaging chamber;

(7) adding concentrated brine to the anolyte liquor whereby to form feed brine;

(8) returning the feed brine to the electrolyzer;

(9) recovering hydrogen and catholyte liquor from individual cells of the electrolyzer through individual vertical risers at a catholyte liquor flow rate sufficient to provide flow characterized by bubbles of gas moving along at substantially the same velocity as the catholyte liquor while substantially avoiding flows characterized by periodic waves of high velocity frothy slugs and alternating plugs of liquid and gas;

(10) collecting the hydrogen and catholyte liquor from the individual risers in a substantially horizontal header;

(11) transporting the collected hydrogen and catholyte liquor from all of the cells in the electrolytzer through the substantially horizontal header to a hydrogen disengaging chamber;

(12) recovering hydrogen from the hydrogen disengaging chamber;

(13) recovering catholyte liquor from the hydrogen disengaging chamber.

(14) adding water to the catholyte liquor in the ratio of 1 part of water per 40 parts of return catholyte liquor to part 1 part of water per 200 parts of return catholyte liquor; and

(15) returning the return catholyte liquor to the individual electrolytic cells.

* * * * *